Figure 1:
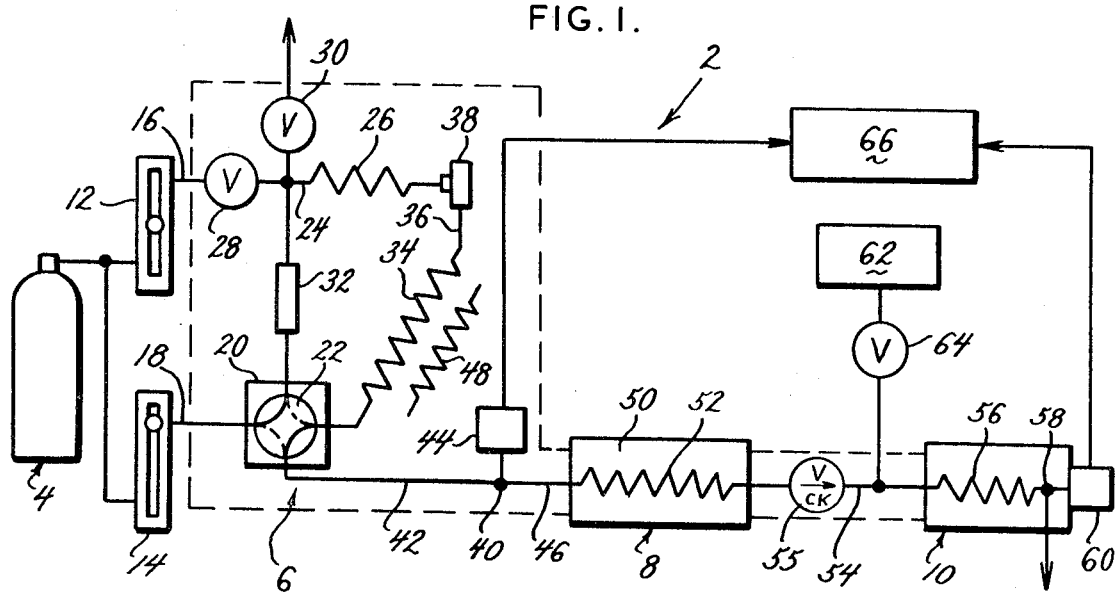

United States Patent

[11] 3,607,075

[72] Inventors Clarence J. Wolf
St. Louis County, Mo.;
John Q. Walker, Madison County, Ill.
[21] Appl. No. 751,563
[22] Filed Aug. 9, 1968
[45] Patented Sept. 21, 1971
[73] Assignee McDonnell Douglas Corporation
St. Louis, Mo.

[54] INSTRUMENT AND METHOD FOR ANALYZING COMPLEX SUBSTANCES
11 Claims, 2 Drawing Figs.

[52] U.S. Cl........................................................ 23/230,
23/232, 23/253, 73/23.1
[51] Int. Cl............................................................ G01n 31/08
[50] Field of Search.............................................23/230, 230
PC, 232 C, 253; 73/23.1; 55/386

[56] References Cited
UNITED STATES PATENTS
3,141,323 7/1964 Taylor et al.................... 73/23.1
3,403,978 10/1968 Favre............................ 23/253 X

*Primary Examiner*—Morris O. Wolk
*Assistant Examiner*—R. M. Reese
*Attorney*—Gravely, Lieder & Woodruff ABSTRACT: A chromatographic apparatus including a chromatographic column through which a fluid carrier medium flows. A complex mixture is introduced into the carrier gas medium prior to the column and is resolved into individual compounds which elute at separate times with the continuing passage of the carrier medium. These compounds are introduced separately into a pyrolyzer which reduces them to pyrolytic fragments. The carrier medium with the pyrolytic fragments in it is introduced into another chromatographic column and eluted therefrom at separate times by the continuing flow of the carrier medium. These fragments are detected and cause a chromatogram unique to the compound to be traced. Once a compound has been eluted from the first column, the flow of carrier medium through that column is halted and that column is isolated from the pyrolyzer and second column so that other compounds will not elute and interfere with the pyrolytic fragments from the prior compounds.

PATENTED SEP 21 1971

3,607,075

INVENTORS
CLARENCE J. WOLF
JOHN Q. WALKER

BY *Gravely, Lieder, & Woodruff*

ATTORNEYS

INSTRUMENT AND METHOD FOR ANALYZING COMPLEX SUBSTANCES

This invention relates in general to the analysis of complex mixtures and, more particularly, to a method and instrument for analyzing such mixtures by the use of chromatography.

While chromatographs are useful in separating complex mixtures into more basic components, it is still difficult to identify the components eluted from such chromatographs. Heretofore, mass or infrared spectrometers have been coupled with gas chromatographs to completely identify the eluted components, and the combination of these two instruments has proved to be an extremely powerful analytical tool. Although gas chromatographs are relatively simple and rugged instruments, spectrometers contain complex electronic circuits, and may require a complex vacuum system. Furthermore, spectrometers employ delicate filaments which must be precisely aligned, making these instruments extremely sensitive to even the slightest jolt or jar. Consequently, spectrometers are not suitable for use in portable analytical units. Moreover, by reason of their complexity they are quite expensive and require a highly trained specialist for successful operation.

Others have attempted to couple two gas chromatographs through a pyrolyzer to ascertain the identity of the individual components eluted from the first of the chromatographs, but such attempts have involved the use of a system of traps prior to the second chromatograph to separately retain and thereby prevent a mixture or overrunning of the individual eluted components from the first chromatograph. However, it is impractical to use more than two or three traps, and as a result, these prior tandem chromatographs were suitable for analyzing only very simple mixtures.

A principal object of the present invention is to provide a relatively simple and rugged instrument which can be used for complete qualitative and quantitative identification of complex mixtures.

Another object is to provide an analytical instrument of the type stated which is relatively simple and inexpensive in construction and easy to operate.

A further object is to provide an instrument of the type stated which is portable, lightweight, and adaptable for use in space and planetary exploration.

Still another object is to provide an extremely simple and rapid method of analyzing complex mixtures.

These and other objects and advantages will become apparent hereinafter.

The present invention is embodied in chromatographic means connected to a pyrolyzer and analytic means for analyzing the fragments discharged from the pyrolyzer. A fluent carrier medium flows through the chromatographic means and the complex mixture of compounds to be analyzed is introduced into the carrier medium prior to the chromatographic means. Continuing flow of the carrier medium elutes the compounds separately and the pyrolyzer reduces each of the compounds to pyrolytic fragments which are analyzed by the analytic means. The flow of carrier medium through the chromatographic means is interrupted while each component is being pyrolyzed and while the fragments of the pyrolysis are being analyzed.

Figure 2:
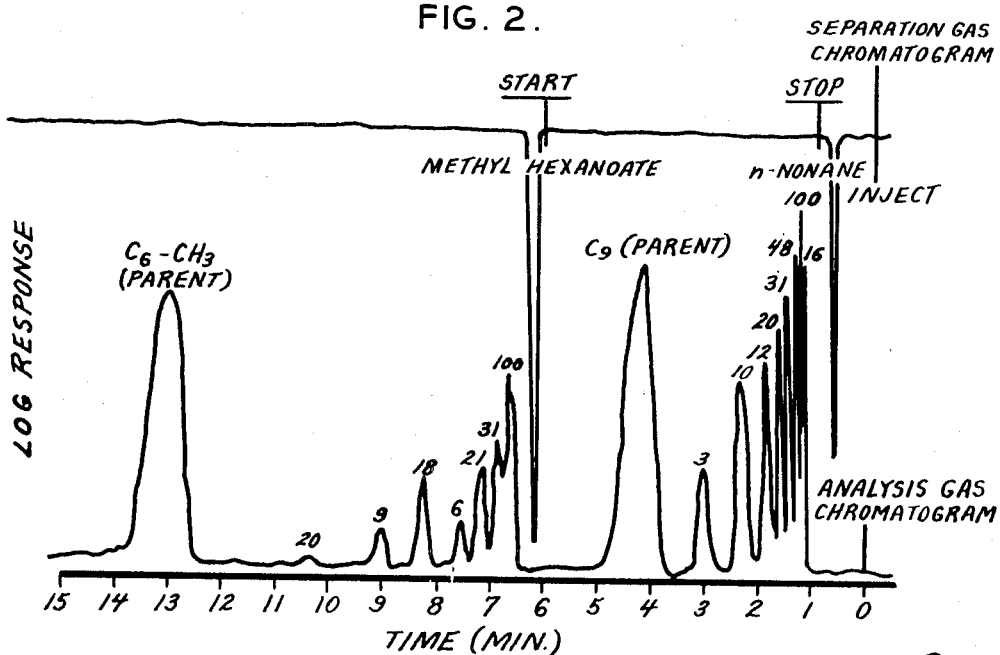

The invention also consists in the parts and in the arrangements and combinations of parts hereinafter described and claimed. In the accompanying drawings which form part of the specification and wherein like numerals and letters refer to like parts wherever they occur:

FIG. 1 is a schematic diagram of an instrument constructed in accordance with and embodying the present invention; and FIG. 2 is a chromatogram resulting from an analysis of a mixture of n-nonane and methyl hexanoate by the instrument.

Referring now in detail to the drawings, 2 designates an instrument for analyzing complex mixtures and that instrument 2 basically includes a carrier gas reservoir 4, a separation gas chromatograph 6, a pyrolyzer 8, and an analysis gas chromatograph 10.

The carrier gas reservoir 4 maintains an inert carrier gas such as pure helium, nitrogen, or argon, under pressure and discharges that gas into a pair of combination flow controllers and rotameters 12 and 14 which, in turn, discharge into the separation gas chromatograph 6 through a pair of carrier gas lines 16 and 18, respectively.

The separation gas chromatograph 6 includes a four-port valve 20 having a shiftable valve element 22 adapted to establish communication between alternate sets of adjacent ports. One of the ports is connected to the carrier gas line 18, while an adjacent port is connected to an internal flow line 24 which terminates at a precolumn 26 having an absorbent material packed into it. Upstream from the precolumn 26, the carrier gas line 16 enters the internal flow line 24 through a pressurizing valve 28. The internal flow line 24 can be furthermore vented upstream from the precolumn 26 through a vent valve 30. Interposed in the internal flow line 24 upstream from the carrier gas line 18 and vent valve 30 is a restrictor 32 which contains a constricted segment for preventing rapid surges of gas in the flow line 24. The precolumn 26 is connected with a separator column 34 through a connecting line 36 having an injector 38 in it. Both the separator column 34 and the precolumn 26 are packed with a suitable chromatographic column packing which is generally although not necessarily an absorbent material. The construction of the injector 38 is not significant and is dictated to a limited extent by the nature of the specimen or mixture to be introduced into the line 36. One type of injector 38 found suitable for numerous substances possesses a puncturable self-sealing membrane through which the unknown specimen can be introduced into the carrier gas by inserting the needle of a hypodermic syringe containing the specimen through the membrane. The separator column 34 discharges into another port of the four-port valve 20, and the remaining port of the valve 20 is connected to a flow divider 40 by means of a flow line 42. The flow divider 40 diverts a predetermined proportion of the flow into a separation detector 44 which is preferably of the flame ionization variety, the remainder of the flow passing into a discharge line 46, through which it leaves the separation gas chromatograph 6. The separation gas chromatograph 6 further includes an electrical heater 48 for varying the temperature of the separator column 34 so that the column 34 may be temperature programmed.

At its opposite end the discharge line 46 flows into the pyrolyzer 8 which includes a cylindrical heat sink 50 surrounding a helical coil 52 wound from a tubular material of an inert metal such as gold, platinum and the like. The heat sink 50 is heated typically by an electrical heater and possesses a large thermal mass so that the coil 52 can be maintained at a substantially constant temperature. At its one end of coil 52 is connected to the discharge line 46 for receiving the major portion of the flow from the flow divider 40. At its opposite end the coil 52 passes into the analysis chromatograph 10 through a connecting line 54, having a check valve 55 in it for preventing reverse flow into the coil 52. Within the analysis chromatograph 10 the connecting line 54 terminates at and flows into an analysis column 56 which contains nonpolar chromatographic column packing which is generally although not necessarily an adsorbent material. The opposite end of the column 56 is connected to a flow divider 58 for diverting a portion of the flow into an analysis detector 60 which is similar to the separation detector 44. The remaining portion of the flow from divider 58 is discharged into the atmosphere or a sample collector. The analysis chromatograph 10 further includes a flow programmer 62 which is connected to the connecting line 54 through a valve 64 upstream from the analysis column 56 but downstream from the check valve 55. The flow programmer 62, by introducing more carrier gas into the analysis column 56, increases the flow rate through that column 56. The flow programmer 62 is not required, and can be discarded or replaced with a temperature programmer, in which case the check valve 55 would not be necessary.

Both the separation detector 44 and the analysis detector 60 are connected to recorder and integrator units 66 (shown as a single entity) which sense current variations from the detectors 44 and 60, record those variations as a function of the time at which they occurred, and further analyze these current variations by integrating the curves or chromatograms so traced.

In use, the instrument 2 is initially adjusted so that the valves 28 and 30 of the separation chromatograph 10 are both closed and the valve element 22 of the four-port valve 20 is set so that communication is established between the carrier gas line 18 and the internal flow line 24 on one hand and the separator column 34 and the flow line 42 on the other as shown by the solid lines through the valve element 22 in FIG. 1. Accordingly, the carrier gas flows through the combination flow controller and rotameter 14 into the carrier gas line 18, from which it discharges into the four-port valve 20 and thence into the internal flow line 24. The flow rate is both ascertained by and controlled at the combination controller and rotameter 14. The carrier gas from the flow line 24 passes through the injector 38 and separator column 34 to the four-port valve 20 again, and flows through the valve 20 to the flow line 42. At the flow divider 40 a small predetermined proportion of the carrier gas flow is diverted into the separation detector 44, while the remaining and greatest proportion of the gas enters the helical coil 52 of the pyrolyzer 8 through the discharge line 46. Thus the lines 16, 24 and 36 and the precolumn 26 in effect constitute a single flow line leading up to the separator column 34, whereas the lines 42 and 46 constitute a single flow line leading away from the column 34 and providing a conduit to the pyrolyzer 8. Within the coil 52 the gas is heated to a relatively high preselected temperature, normally within the range between 200° C. and 1,000° C. After being heated, the carrier gas flows through the connecting line 54 and check valve 55 into the analysis column 56, and beyond the analysis column 56 a small predetermined proportion of the flow is diverted at the flow divider 58 into the analysis detector 60, while the remainder of the flow is discharged into the atmosphere or collected.

Once the flow of the carrier gas is stabilized, a small amount (normally between $10^{14}$ and $10^{18}$ grams) of a compound mixture to be analyzed is introduced into the flowing carrier gas upstream from the separator column 34 at the injector 38. As the compound mixture and the carrier gas in which it is entrained pass through the separation column 34, the various compounds in the specimen will pass through the packing material of the column 34 in different times. The particular composition of the column packing is not critical, but it must be capable of resolving the individual compounds of the mixture. Those compounds which are not strongly attracted to or otherwise retained over relatively long periods in the packing of the column 34 will pass most readily through it and will elute first.

The first eluted compound passes with the carrier gas through the four-port valve 20 to the flow line 42 and into the flow divider 40 where a predetermined portion of it is diverted into the separation detector 44. The presence of this compound is sensed by the detector 44, and it transmits this sensing to the recorder and integrator unit 66 as a current variation. This current variation is, in turn, plotted as a function of time on a graph or chromatogram prepared by the recorder of that unit 66. Accordingly, the exact time after the injection of the specimen at which the first eluted compound reaches the separation detector 44 is preserved and will be depicted as a peak on the chromatogram. When the recorder indicates that the first eluted compound has passed the separation detector 44, the valve element 22 of the four-port valve 20 is shifted such that the carrier gas line 18 and the flow line 42 are placed in communication. This isolates the separator column 34 and halts the flow of the carrier gas through the column 34, thereby preventing immediate elution of the second compound. Consequently, the second compound will not overrun and mix with pyrolytic fragments of the first eluted compound. At the same time, the carrier gas in the isolated segment of the separation chromatograph 6 may be released to the atmosphere by opening the vent valve 30 so as to prevent subsequent band spreading. This, however, is not necessary when the analysis of the pyrolytic fragments of the first compound requires less than 3 to 4 hours, since the overall band resolution in the separator column 34 remains essentially unchanged during this time even under elevated pressures. "Band" in this context means the time width of a chromatographic elute, and it is important that the bands be separate and distinct to prevent overrunning of the various compounds. Under low pressure conditions, that is when the vent valve 30 is open, the remaining compounds of the mixture can be retained in the column 34 even longer without appreciable band spreading, yet the true retention time of the various compounds in the column 34 remains unchanged. Any tendency for the carrier gas to surge when the flow line 24 is vented and thereby remove material from the edge of the separator column 34 is eliminated by the presence of the restrictor 32 in the flow line 24. The precolumn 26 serves as a trap for any material which may be removed by the carrier gas flowing reversely toward the vent valve 30 as the separation chromatograph 6 is vented.

When the valve element 22 is shifted, the carrier gas is diverted past the separator column 34 and flows directly from the carrier gas line 18 to the flow line 42. This continuing flow of carrier gas forces the first eluted compound into and through the coil 52 of the pyrolyzer 8. The pyrolyzer is maintained at a temperature high enough to thermally decompose at least a portion of the first eluted compound into pyrolytic products or fragments, and these fragments flow into the analysis column 56 through the connecting line 54 with the continuing flow of the carrier gas.

The analysis column 56 operates on the same principle as the separator column 34, the various pyrolytic fragments passing through the column in different times depending on the particular properties of the fragments and the properties of the packing in the column 56. The continuing flow of the carrier gas elutes the pyrolytic fragments at different time intervals, and consequently each fragment passes the flow divider 58 separately. Since the flow divider 58 diverts a predetermined portion of the entire flow into the analysis detector 60, the analysis detector 60 will sense the various fragments, indicating their presence as a variation in ionization current. This current variation, in turn, is picked up by the recorder and integrator unit 66, and each variation is plotted as a function of time on the same graph on which the current variations from the separation detector 44 are plotted. In actual practice, time is abscissa while current is the ordinate on the graph produced by the recorder of the unit 66. Accordingly, the presence of a particular pyrolytic fragment within the analysis detector 60 is denoted by a peak or change in amplitude at a particular time. For each compound these peaks appear in a continuing series. Usually, the last peak is considerably larger than and dominates the peaks which precede it, and that peak represents the unpyrolyzed portion of the compound itself. Such a peak is termed the parent peak. The relative ratio of the individual pyrolytic fragments will be different for each compound pyrolyzed and will therefore trace a curve or chromatogram peculiar to the particular compound. The tracing is often called a pyrogram and is analogous to a "fingerprint." The compound is identified by comparing its pyrogram or chromatogram with the chromatograms traced by known substances until a virtually superimposable one is found. To aid in this identification, the area defined by each peak is ascertained through a process of integration and this integration is performed within the integrator of the unit 66. The relative retention time, that is, the time from preselected point in time required for any particular fragment to elute from the column 56, is also significant and greatly aids in classifying and identifying the compound from its pyrolyzed fragments. A convenient starting point from which to measure retention time is the commencement or emergence of the first peak. As far as the areas of each peak are concerned, they are generally normalized to a convenient standard such as the sum of the areas of the nonparent peaks, or the area of the largest peak other than the parent peak. The last method of normalization has been found most suitable for analysis of the curve traced from sensing of the analysis detector 60.

When the analysis of the pyrolytic fragments is complete, and this will be denoted on the recorder by an extended line of zero amplitude, the separator column 34 is repressurized by opening the pressurizing valve 28 and allowing the carrier gas to flow through the combination flow controller and rotameter 12 and carrier gas line 16 into the isolated portion of the separation chromatograph 6. When the pressure within the column 34 reaches its original value, the pressurizing valve 28 is closed and the valve element 22 of the four-port valve 20 is shifted to its original position in which the carrier gas line 18 and the internal flow line 24 on one hand and the separation column 34 and flow line 42 on the other hand are in communication again. The carrier gas will, therefore, again flow through the separator column 34 and flow elute the next compound. That compound will be sensed by the separation detector 44, and pyrolyzed into pyrolytic fragments by the pyrolyzer 8, the pyrolytic fragments, in turn, being sensed individually by the analysis detector 60. After the second eluted compound has passed the separation detector 44, the separator column 34 is again isolated by shifting the valve element 22 so that the pyrolysis of the second compound and the analysis of the resulting fragments can be completed without danger of being overrun or intermingled with the third eluted compound. The same sequence is repeated for each compound eluted from the separator column 34.

The relative quantity of each compound eluted from the separation detector 44 can be ascertained by integrating the peaks traced in response to sensings of the separation detector 44. Since the split ration of the flow divider 40 and the amount of the specimen are known, the exact quantity of each compound can be calculated.

Since compounds of low molecular weight pass through the column 34 at high temperatures without being retained, while compounds of high molecular weight are not easily dislodged at low temperatures and, therefore, are retained an inordinate amount of time, it is desirable to commence the elution from the separator column 34 at relatively low temperatures, and increase the temperature of the column 34 with each compound eluted therefrom. Consequently, the compounds of low molecular weight will resolve at the outset, and once they are removed, the compounds of higher molecular weight will more readily elute without requiring an excessive amount of time and carrier gas. The increase in temperature of the separation column is controlled by the heater 48 and is known as temperature programming. The same effect can be achieved by pressure or flow programming, that is, raising the pressure of the carrier gas to dislodge the compounds of higher molecular weight; however, this latter technique is usually applied to only the analysis column 56.

The analysis column 56 is flow or pressure programmed by means of the flow programmer 62 which discharges more carrier gas into the connecting line 54 as the various pyrolytic fragments are eluted from the analysis column 56, thereby increasing the pressure within and flow through it so as to force the higher molecular weight fragments through the column faster. Consequently, the analysis of the pyrolytic fragments takes relatively little time and the separator column 34 is, therefore, not isolated for extended periods. In this connection, it is again noted that separations have been interrupted for as long as 4 hours with negligible band spreading or change in the true retention time within the column 34, and this is attributable to the fact that is pressure within the column 34 is relieved, while the column 34 is isolated. In lieu of flow programming, the analysis column 56 may be temperature programmed.

EXAMPLE

The separation gas chromatograph 6 was a modified Hewlett-Packard 5750 equipped with a separator column 34 formed from stainless steel tubing, 4 meters × 0.65 inch i.d. The column 34 contained 15 percent stabilized diethylene glycol succinate on 80/90 mesh Anakrom ABS. The restrictor 32 was a stainless steel tube 6 feet × 0.010 inch i.d. The separation detector 44 operated on the flame ionization principle.

The pyrolyzer 8 included a gold coil 52 formed from a 20-inch length of 0.040-inch i.d. gold tubing wound into a ½-inch diameter helix. The heat sink 50 was a nickel cylinder having a large thermal mass, and it was maintained at 700° C. the variation therefrom not exceeding ± 5° C.

A Perkin Elmer Model 11 equipped with a flame ionization detector 60 served as the analysis gas chromatograph 10, and it possessed an analysis column 56 formed from a 15-foot length of 0.65 inch i.d. stainless steel tubing. The column 56 contained 25 percent Dow Corning DC 200 on 80/100 mesh Chromosorb P and was operated at 185° C. The recorder of the unit 66 was a dual pen Hewlett-Packard Model 7128A and the integrator of the unit 66 was an Infotronics Model CRS 100 digital integrator.

Helium flowing at 53 ml./min. was introduced into the separation gas chromatograph 6 through the carrier gas line 18, and this gas passed through the coil 52 of the pyrolyzer 8 and the column 56 of the analysis chromatograph 10 at 48 ml./min., 5 ml. having been diverted at the divider 40 into the separation detector 44. The flow rates given represent actual flow rates corrected to ambient conditions and consequently reflect the mass of the flow. A mixture of n-nonane and methyl hexanoate was the mixture or specimen, 1.0 microliter ($10^{-3}$g.) of it being introduced into the connecting line 36 at the injector 38.

The chromatogram traced by the recorder and integrator 66 (FIG. 2) indicated both the time at which the n-nonane and methyl hexanoate eluted and the unique fingerprint or chromatogram of the pyrolytic fragments of both. More specifically, the upper curve or tracing indicates that the nonane, which is the first compound, was eluted approximately 1 minute after the mixture was injected. Thirty seconds after the nonane eluted, the elution being indicated by the first inverted peak, the separation gas chromatograph 6 was isolated by shifting the valve element 22 and vented by opening the vent valve 30. Contemporaneously, the n-nonane was pyrolyzed and the products from the pyrolyzed n-nonane passed into the analysis column 56 from which they emerged at spaced intervals and passed into the analysis detector 60. The portion of the lower tracing between inverted peaks of the upper tracing represents the sensing of the analysis detector 60. Within 6 minutes from the original injection all of the pyrolyzed fragments of the n-nonane were eluted from the analysis column 56, and the isolated segment of the separation chromatograph 6 was again pressurized through the pressurizing valve 28. Immediately thereafter the methyl hexanoate eluted as depicted by the tracing of the second inverted peak, and that compound was subsequently pyrolyzed and passed through the analysis column 56 and detector 60, leaving the tracing following the second inverted peak.

By comparing both of the lower tracings with tracings of the pyrolyzed fragments of known compounds, the fact that the first tracing represents n-nonane and the second represents methyl hexanoate can be readily determined.

In FIG. 2 the current from the detectors 44 and 60 is the ordinate plotted logarithmically. The response from the detector 60 is 100 times more sensitive than the response from the detector 44.

The relative amounts of n-nonane and methyl hexanoate are determined by integrating each of the inverted peaks. By integrating each peak of the lower tracing, it is possible to more accurately define and classify each tracing and, of course, the compound or component it identifies The small numbers above each peak indicate the area that peak normalized or taken relative to the area of the largest peak other than the parent or dominating peak. For hydrocarbons the total number of well resolved peaks is the same as the number of carbon atoms in the molecule. As far as the tracing of the pyrolytic fragments of n-nonane is concerned, the first peak represents methane and with the exception of the parent compound, the other peaks $C_2$ to $C_{n11}$ olefins (where $n$ is the carbon number of the parent).

In comparison to devices employing mass spectography, instrument 2 is relatively simple, both in construction and operation. Moreover, the columns 34 and 56 are extremely rugged and are not adversely affected by severe jolts and jars. This is also true of the remaining components of the instrument 2. By reason of this fact, instrument 2 could be used to analyze the composition of the soil or sediments of other planets and bodies in space.

The unique and reproducible programs can be used to identify among other substances, polymers, drugs, bacteria, proteins and amino acids, and hydrocarbons.

While the separator column 34 normally resolves the complex mixture into individual compounds, it may also be used to separate the mixture into various related groups of compounds, in which case the pyrolytic fragments resolved in the analysis column 56 are those of a specific group of compounds. Hereinafter, the term component will be used to denote the individual eluates from the separation column 34, whether they be individual compounds or groups of compounds.

This invention is intended to cover all changes and modifications of the example of the invention herein chosen for purposes of the disclosure which do not constitute departures from the spirit and scope of the invention.

What is claimed is:

1. A method of analyzing complex mixtures, said method comprising introducing a complex mixture into a carrier gas, passing the carrier gas with the complex mixture in it through a fist chromatographic column whereby the complex mixture will be resolved into components which elute separately from the first column, passing the carrier gas and the individual components eluted from the first column into a pyrolyzer for reducing the eluted components to pyrolytic fragments, passing the pyrolytic fragments and the carrier gas into a second chromatographic column whereby the pyrolytic fragments will elute separately from the second column, and diverting the flow of carrier gas around the first column after each component has eluted therefrom so that the flow of carrier gas through the first column is interrupted and the carrier gas is introduced directly into the pyrolyzer for sweeping the separately eluted component through the pyrolyzer and second column, the flow of current gas remaining diverted long enough to prevent the pyrolytic fragments of the succeeding component from overrunning the pyrolytic fragments of the preceding component in the pyrolyzer 2. A method according to claim 1 wherein the flow of carrier gas is diverted around the first chromatographic column until all of the pyrolytic fragments from the previously eluted component from the first column have eluted from the second chromatographic column.

3. A method according to claim 1 and further characterized by dividing the flow of the carrier gas before the components in it are pyrolyzed, and analyzing the carrier gas for the presence of eluted components in the carrier gas.

4. A method according to claim 3 and further characterized by dividing the flow of carrier gas emerging from the second chromatographic column, and analyzing the carrier gas divided out for the presence of eluted pyrolytic fragments.

5. An apparatus for analyzing complex mixtures, said apparatus comprising a source of pressurized carrier gas, a first flow line connected to the source of carrier gas, means connected with the first flow line for introducing the complex mixture into the carrier medium flowing in the first flow line, a first chromatographic column connected at its one end to the first flow line for receiving the flow of carrier gas as well as the complex mixture in that carrier gas whereby the complex mixture will be resolved into components which elute at different times from the first chromatographic column as the carrier gas flows through the first column, a second flow line connected to the opposite end of the first chromatographic column, a valve in the second flow line and further connected with the source of carrier gas upstream from the first column for diverting the carrier gas around and causing it to bypass the first chromatographic column whereby the flow of carrier gas through the first column may be interrupted after the elution of each component from the first column so that intervals between the elution of components is extended, a pyrolyzer connected to the second flow line for receiving the carrier gas having the eluted components therein and for heating the eluted components sufficiently while they are still in the carrier gas to reduce them to pyrolytic products, the valve preventing the individual components eluted from the first chromatographic column from overrunning each other in and beyond the pyrolyzer so that the individual eluted components are heated separately, and a second chromatographic column connected to the pyrolyzer for receiving the flow of carrier gas and pyrolytic products discharged from the pyrolyzer whereby the pyrolytic products of each component from the first column will elute at different intervals from the second column and can thereafter be analyzed.

6. An apparatus according to claim 5 wherein means are connected with the second flow line for ascertaining when a component elutes from the first chromatographic column.

7. An apparatus according to claim 6 and further characterized by means for detecting the individual pyrolytic products eluted from the second chromatographic column.

8. An apparatus according to claim 6 wherein the means for ascertaining the elution of a component from the first column comprises a flow divider in the second flow line and detecting means for sensing the presence of an eluted component in the carrier gas divided from the main flow at the flow divider.

9. An apparatus according to claim 8 wherein the detecting means is a flame ionization detector.

10. An apparatus according to claim 6 and further characterized by relief means for reducing the pressure of the carrier gas within the first chromatographic column when the valve is adjusted to direct the carrier gas around and thereby bypass the first column.

11. An apparatus according to claim 10 wherein the means for detecting pyrolytic products eluted from the second column comprises a flow divider for dividing the flow of carrier gas after it discharges from the second column and a flame ionization detector for sensing the presence of pyrolytic products in the flow divided out by the flow divider.

UNITED STATES PATENT OFFICE
CERTIFICATE OF CORRECTION

Patent No. 3,607,075　　　　　　　　Dated September 21, 1971

Inventor(s) Clarence J. Wolf and John Q. Walker

It is certified that error appears in the above-identified patent and that said Letters Patent are hereby corrected as shown below:

In the claims, Col. 7, line 40, "fist" should be "first".

In the claims, Col. 7, line 53, "current" should be "carrier".

Signed and sealed this 11th day of April 1972.

(SEAL)
Attest:

EDWARD M. FLETCHER, JR.　　　　　ROBERT GOTTSCHALK
Attesting Officer　　　　　　　　Commissioner of Patents